United States Patent [19]

Svanstrom et al.

[11] 4,109,974
[45] Aug. 29, 1978

[54] PLAIN AND THRUST BEARING DEVICE

[75] Inventors: Alf Henrik Svanstrom; Karl-Erik Kangas, both of Fagersta, Sweden

[73] Assignee: Fagersta Secoroc AB, Fagersta, Sweden

[21] Appl. No.: 765,620

[22] Filed: Jan. 25, 1977

[30] Foreign Application Priority Data

Feb. 16, 1976 [SE] Sweden ............................. 7601661

[51] Int. Cl.² ........................................... F16C 19/00
[52] U.S. Cl. ................................................... 308/8.2
[58] Field of Search ........................ 308/8.2, 4 A, 62

[56] References Cited

U.S. PATENT DOCUMENTS

| 3,990,525 | 11/1976 | Penny | 308/8.2 |
| 3,995,917 | 12/1976 | Quinlan | 308/8.2 |

*Primary Examiner*—Richard A. Bertsch
*Attorney, Agent, or Firm*—Larson, Taylor and Hinds

[57] ABSTRACT

A device for reducing friction between surface planes sliding against each other in axial thrust bearings between the shaft end and roller in rotary roller bits and rollers for rock and earth boring, especially at full size tunnel driving. A friction reducing groove is arranged eccentrically in relation to the axes of the shaft end and the roller in at least one of the surface planes sliding against each other. Said groove is filled with material having a friction reducing and/or lubricating effect.

16 Claims, 5 Drawing Figures

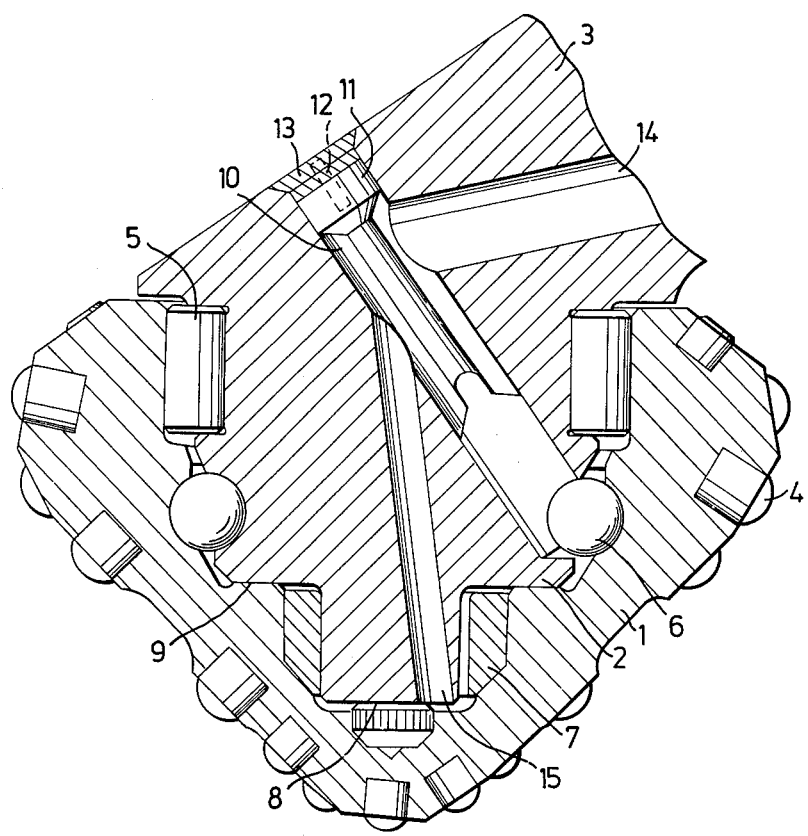

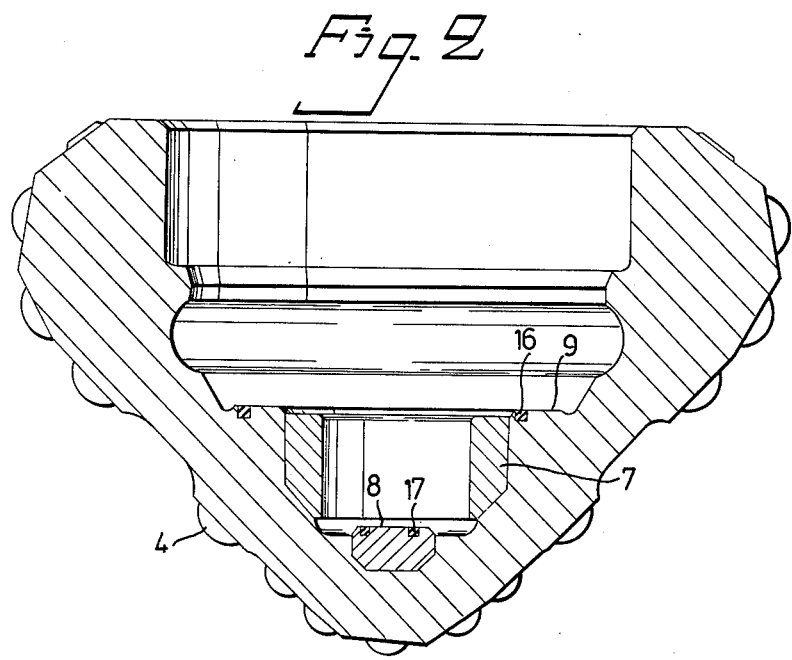
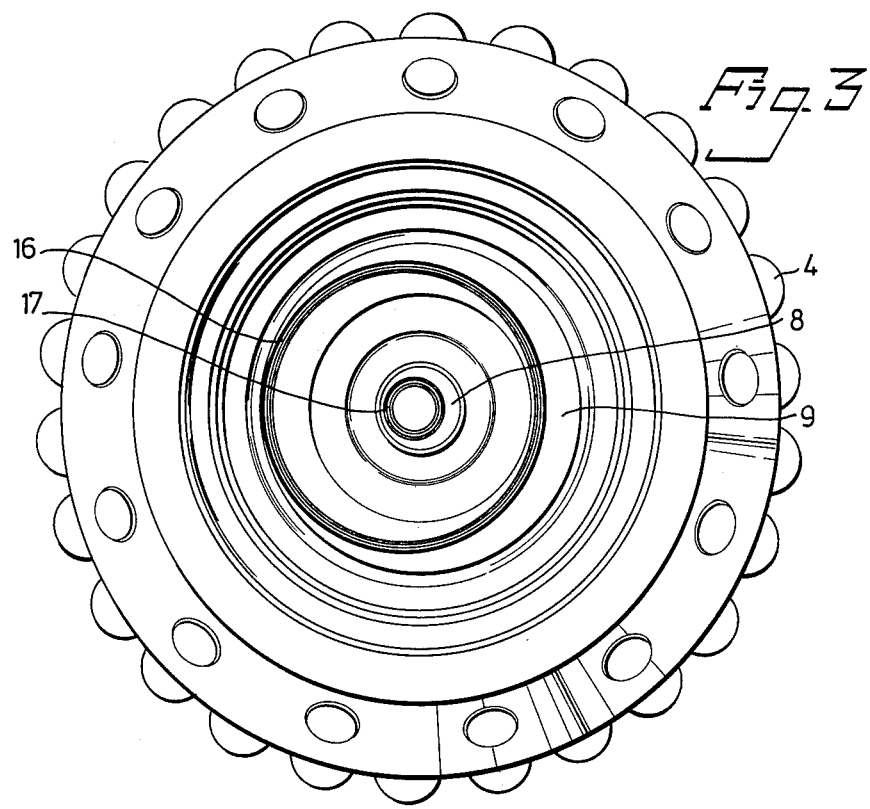

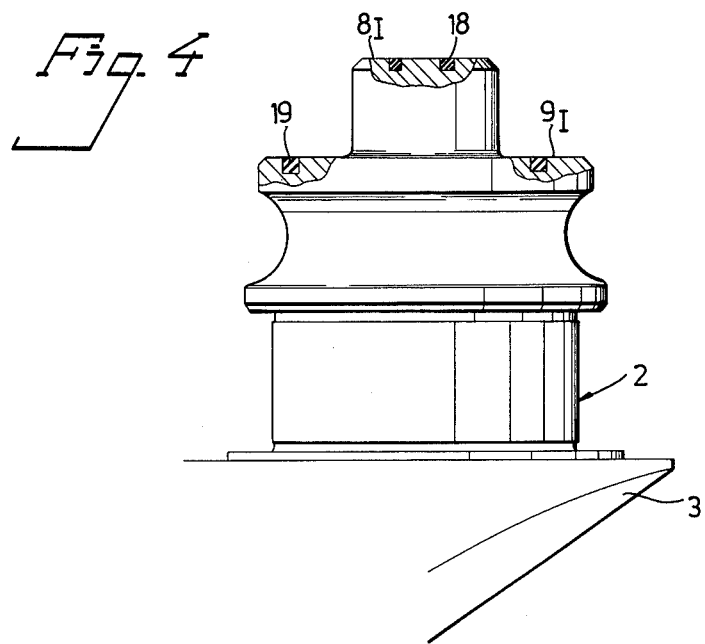
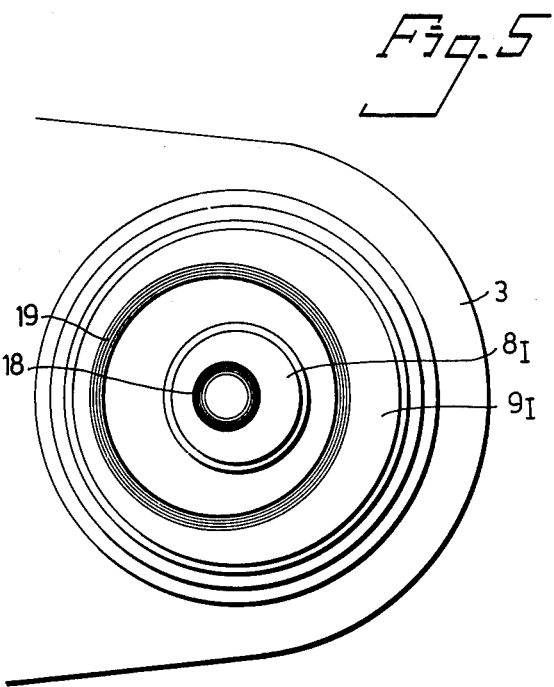

PLAIN AND THRUST BEARING DEVICE

The present invention relates to a bearing construction for reducing the coefficient of friction in plain and thrust bearing surfaces, more specifically in the journalling of the rollers on shaft ends in rotary roller bits and rollers for full size tunnel driving.

In previously known rotary roller bits the rollers have been mounted on the shaft end so that only the end surface itself of the shaft has engaged against a contact surface in the roller, in this way obtaining a plain thrust bearing for taking up the axial pressure occurring during the drilling operation.

The drawbacks arising in a bearing of the kind mentioned above are that the bearing surfaces for taking up the large axial forces to which the rollers are exposed during drilling are very small, for reasons of design and space, whereby a large frictional resistance is obtained, which in turn results in large heat generation in the bearing surfaces, and thereby great wear with accompanying short life for the bearing structure in relation to the remaining elements of the rotary roller bit.

During drilling, compressed air or water is flushed through the bearing structure, to cool the bearings and at the same time prevent mineral particles which have broken away from working their way into the bearing structure to act there as a grinding agent on the bearing surfaces.

When the bearings are flushed through, it is however not possible to avoid entraining the lubricant which is packed in during manufacture of the roller bit, whereby unsatisfactory lubrication of the bearing surfaces is obtained. The dry and unlubricated bearing surfaces in plain and thrust bearings especially, are fragmented into small particles, which during their passage through the remaining bearing construction give rise to further damage in the rolling contact bearings.

The present invention has the object of eliminating the said drawbacks in known bearing structures in rotary roller bits and rollers for full size tunnel driving, the characterizing features of the invention being apparent from the appended patent claims.

The advantage with a bearing structure according to the invention is that larger bearing surfaces are obtained, and that lubrication of these is improved in a significant manner. In practical trials it has been found that a bearing structure according to the invention has a life greater than previously known bearing structures, and that the bearing conditions of the rollers in a rotary roller bit are no longer decisive for the life of the bit.

The invention is described in detail in the following while referring to the appended drawing, which schematically shows a preferred embodiment of the invention.

FIG. 1 is a section through the main axis of symmetry of a roller with associated shaft end according to the invention.

FIG. 2 is a section as in FIG. 1 but only showing the roller.

FIG. 3 is a plan view of the roller according to FIG. 2.

FIG. 4 is a partially sectioned side view, by itself, of the shaft end in FIG. 1.

FIG. 5 is a plan view of the shaft end according to FIG. 4.

The roller, denoted by the numeral 1, shown in the drawing figures, is journalled on a shaft end 2, made in one piece with a portion of its leg 3. The roller 1 is equipped with carbide teeth 4, but can also be equipped with steel teeth integral with the roller 1. The roller mounting comprises a radial roller bearing 5, and axial/radial ball bearing 6 and a plain bearing 7, together with two friction thrust bearings 8 and 9, respectively, of the axial type. The balls in the axial/radial ball bearing 6 prevent the roller 1 from being displaced in an axial direction in relation to the shaft end 2, the balls being fed in through the bore 10, whereafter it is plugged with a ball retaining plug 11 located correctly by means of a pin 12, whereafter the retaining plug is welded in place with a weld 13.

Flushing to cool and clean the bearing structure is usually carried out with air, supplied through the canal 14 and distributed through the bores 10 and 15 to the bottom of the roller and the ball bearing location. In known cases, the bearing structure is lubricated with high temperature grease, which, however, is blown or washed out of the bearings by the coolant supplied during drilling.

The improved lubrication according to the invention, primarily of the bearing surfaces 8 and 9, is provided by eccentrically cut grooves 16 and 17 in the roller 1, said grooves being so designed that the greatest amount of the friction surface is covered during rotation. Correspondingly eccentrically grooves 18 and 19 can also be cut in the friction bearing surfaces $8_I$ and $9_I$ in the end surface of the shaft end. In these grooves, eccentrically in relation to the ring, solid lubricating elements of good lubricating ability, which are made from metal or other friction reducing material, are accommodated. The best embodiment of said eccentrically grooves 16, 17, 18 and 19 has found to be one with a rectangular cross section and with the greatest possible cross section in relation to the surfaces 8, 9 and $8_I$, $9_I$, respectively. The friction reducing and lubricating material may be attached within the grooves by suitable means including procedures whereby the material is cast, pressed, soldered, brazed or cemented in the eccentric grooves.

In practical trials with a silver alloy, having more than 50% Ag, accommodated in the lubricating element grooves 16, 17, 18 and 19, the bearing surfaces did not show any notable wear after the carbide cutting teeth 4 were consumed. Neither had there been observed any fragmentation of the friction surfaces 8, 9 and $8_I$, $9_I$, respectively. Other materials found suitable for use as the friction reducing material include other metals such as those selected from the group consisting of lead, tin, copper, bronze, molybdenum and beryllium. Non-plastic materials such as Nylon and Teflon may also be used.

The embodiment described above is only one of many possible embodiments, and it is therefore natural for one skilled in the art to further modify and improve the described invention within the scope of the patent claims.

What we claim is:

1. A rotary roller bit comprising a shaft end and a roller, said roller operatively connected to the shaft end to rotate relative thereto about an axis, said roller and shaft end including plane surfaces facing each other and sliding against each other and forming axial thrust bearing surfaces between the shaft end and the roller, and including a friction reducing device for reducing friction at said sliding surfaces, said device including at least one groove formed in at least one of said sliding surfaces and located eccentrically relative to said axis, and including a material filling the groove and having a friction reducing effect relative to the material forming the remainder of the said facing sliding plane surfaces.

2. The invention of claim 1, wherein the surface plane of the roller sliding against the shaft end has at least one friction reducing groove disposed eccentrically in relation to the axes of the shaft end and roller.

3. The invention of claim 1, wherein the roller has two surface planes sliding against the shaft end, both of which have eccentric grooves filled with a friction reducing and lubricating material.

4. The invention of claim 1, wherein the surface plane of the shaft end sliding against the roller has at least one friction reducing groove, disposed eccentrically in relation to the axes of the roller and shaft, the groove being filled with a friction reducing and lubricating material.

5. The invention of claim 1, wherein the shaft end has two surface planes sliding against the roller, both having eccentric grooves which are filled with a friction reducing and lubricating material.

6. The invention of claim 1, wherein the shaft end and the roller have complementary sliding surface planes at the end surface of the shaft and the bottom of the roller, respectively, and at least one further pair of surface planes sliding against each other, substantially parallel with the first-mentioned planes, at least one of the planes having a friction reducing groove disposed eccentrically in relation to the axes of the roller and shaft end, said groove being filled with a friction reducing and lubricating material.

7. The invention of claim 1, wherein the eccentric groove has a rectangular cross section.

8. The invention of claim 1, wherein the eccentric grooves are filled with silver or with a silver alloy having other alloying substances to a maximum of 50%.

9. The invention of claim 1, wherein the eccentric grooves are filled with a metal having good lubricating ability selected from the group consisting of lead, tin, copper, bronze, molybdenum and beryllium.

10. The invention of claim 1, wherein the eccentric grooves are filled with a plastic, such as Nylon or Teflon.

11. The invention of claim 1, wherein the friction reducing and lubricating material is cemented in the eccentric grooves.

12. The invention of claim 1, wherein said groove is formed as a circle, which circle is located eccentrically relative to said axis.

13. The invention of claim 1, wherein the friction reducing and lubricating material is cast in the eccentric grooves.

14. The invention of claim 1, wherein the friction reducing and lubricating material is pressed in the eccentric grooves.

15. The invention of claim 1, wherein the friction reducing and lubricating material is soldered in the eccentric grooves.

16. The invention of claim 1, wherein the friction reducing and lubricating material is brazed in the eccentric grooves.

* * * * *